N. SPANOVIC.
BICYCLE PROPULSION.
APPLICATION FILED MAR. 28, 1914.
1,141,364.
Patented June 1, 1915.
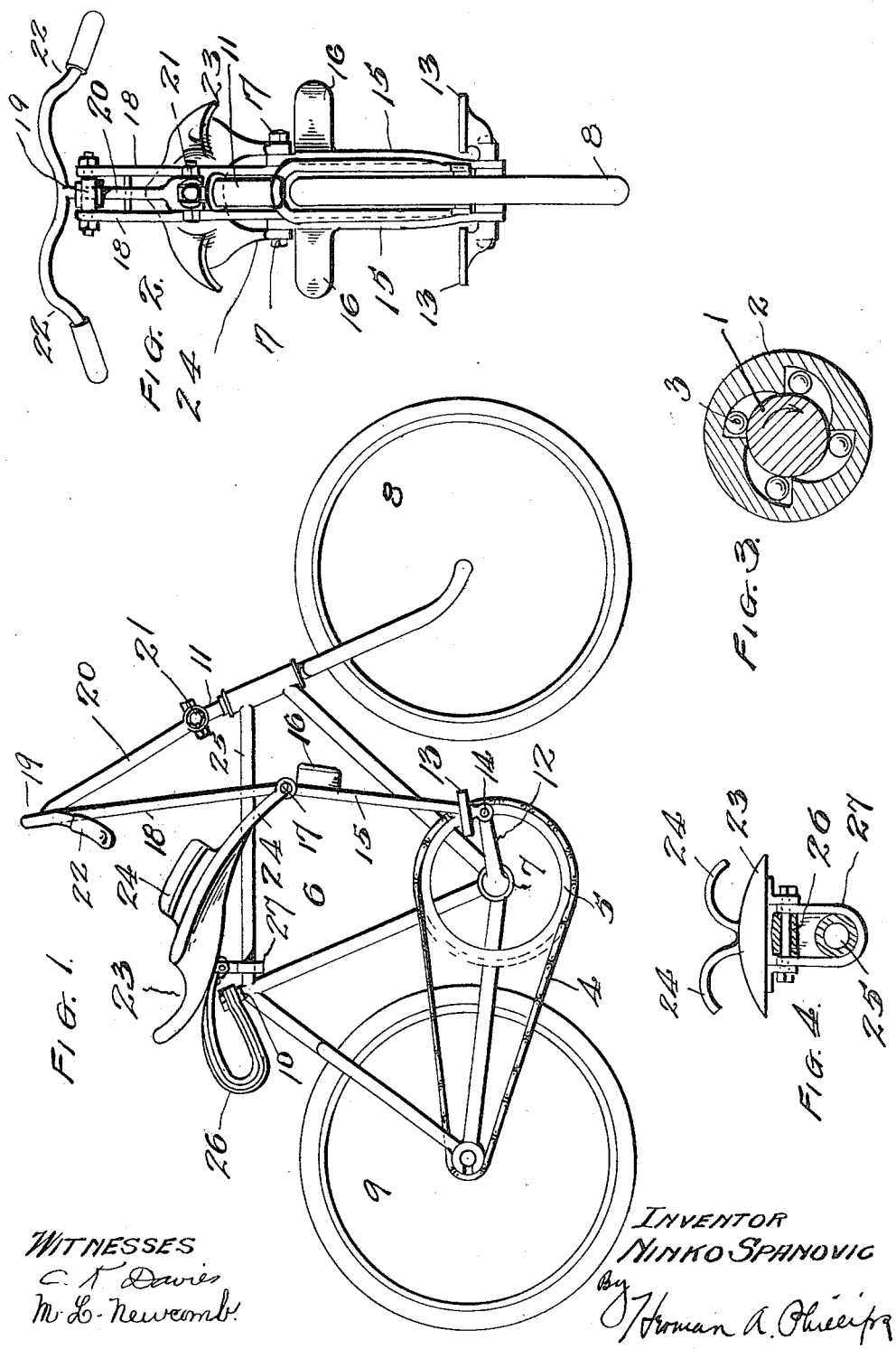
INVENTOR
NINKO SPANOVIC
WITNESSES

UNITED STATES PATENT OFFICE.

NINKO SPANOVIC, OF PITTSBURGH, PENNSYLVANIA, ASSIGNOR OF ONE-HALF TO HERMAN A. PHILLIPS, OF WASHINGTON, DISTRICT OF COLUMBIA.

BICYCLE PROPULSION.

1,141,364.      Specification of Letters Patent.      Patented June 1, 1915.

Application filed March 28, 1914. Serial No. 827,922.

*To all whom it may concern:*

Be it known that I, NINKO SPANOVIC, citizen of the United States, residing at Pittsburgh, in the county of Allegheny and State of Pennsylvania, have invented certain new and useful Improvements in Bicycle Propulsion, of which the following is a specification.

The present invention relates to improvements in bicycle propulsion, and is designed particularly for the purpose of providing a bicycle which may be propelled by the action of both the upper and lower limbs of the rider, in order to increase the power applied and the resulting speed, and also for the purpose of providing exercise for the muscles of the entire body while the bicycle is being propelled.

The primary object of the invention is to convert a bicycle of usual or suitable construction employing the foot power propulsion, into a combined foot and manually propelled bicycle.

With these objects in view the invention consists in the novel combination and arrangements of parts whereby the bicycle may be propelled from power applied both manually and by the use of foot pedals.

In the accompanying drawings I have illustrated one complete example of the physical embodiment of my invention constructed according to the best mode I have so far devised for the practical application of the principles of the invention. In this embodiment I have illustrated a bicycle employing a driving chain, but it will be understood that this driving means is merely typical, and that other suitable driving means may be used in conjunction with my propelling device.

Figure 1 is a side view of a bicycle having my novel propelling means applied thereto. Fig. 2 is a front view of Fig. 1. Fig. 3 is a transverse sectional view of a conventional form of driving clutch employed within the hub of the bicycle. Fig. 4 is a rear detail view of the saddle.

As illustrated in Fig. 3, it will be seen that I employ a crank movement using an oscillatable shaft 1 from which a continuous rotary movement is imparted to the member 2 through the rollers or balls 3, and the rotary member 2 transmits its motion to the chain 4 through the sprocket wheel 5, and the power is applied to the rear axle on the smaller pinion as usual. The bicycle which I employ is of a well known type embodying the frame 6, the crank hanger 7, the wheels 8 and 9, the seat post 10, and the steering post 11. These parts are of usual construction as before stated.

In converting the bicycle for use in connection with my invention, I employ a pair of crank arms 12 which are integral with the shaft 1, and each arm has a pedal 13 pivoted at its outer end, so that the crank arms 12 may be depressed by power applied on the pedal 13.

At 14 a link 15 is connected to the outer end of each crank arm 12, and this pivot 14 is the pintle or bolt upon which the pedal 13 is pivoted. The two arms 15 are each provided with a plate 16 against which the knees of the rider are adapted to bear, and be in constant engagement therewith. At 17, 17 a second pair of arms or links 18 are pivoted to the arms 15, and these links extend above the frame of the machine, and are pivoted to a swivel sleeve 19 which surrounds the bar 20 and permits free rotary motion of the steering bar within the sleeve.

At 21 a universal joint is provided between the bar 20 and post 11.

As before stated, there are two of these side arms 15 and two of the links 18, the complementary members being located at each side of the frame of the machine and back of the front steering post. The bar 20 is provided with a handle bar as 22, 22 and, in Fig. 2, the location and relative position of this handle bar is indicated.

I utilize the novel form of saddle as indicated at 23 as a supporting means for the side arms and side links in their movement as they transmit power from the handle bars to the crank 12. This saddle 23 is provided with a bifurcated or forked front portion 24 which straddles the upper horizontal frame post 25, and extends downwardly to form a support for the bolt or pivot 17 which connects the side arms and side links. This saddle 23 is flexibly supported from the seat post 10 by means of a leaf spring 26 which is bolted to the top of the seat post and secured to the saddle, and a clip or clevis 27 is pivoted to the saddle encircling the top frame bar 25 to permit the movement of the resilient saddle 23.

The position of the rider when operating the bicycle assumes him to be seated in the saddle 23 with his feet upon the pedals 13 and his knees bearing against the knee plates 16, and has his hands, of course, grasping the handles of the handle bars 22. In propelling the bicycle the rider bears down upon the pedals and pushes against the knee plate, and at the same time pulls on the handle bars. This manual and pedal movement causes the pivoted post 20 to swing on its center 21, toward the rider, and the side links 18 are thus depressed, the pivot pin 17 is moved downwardly and forwardly, and the pedals are, of course, depressed through an arc of approximately 90°. This action imparts rotary movement to the crank shaft 1, and from the shaft the rotary motion is transmitted through the sprocket 5 and chain 4 to the rear wheel 9. The up stroke of the pedals is caused by a push upon the handle bars 22, and a continuance of this pulling and pushing movement of the manual power and the downward movement of the pedal power finally imparts a high speed to the bicycle. The rider is made comfortable in his seat by its resilient support, and the different muscles of his body which are brought into play by both manual and pedal power are, of course, well developed from the exercise. The added manual power applied to the bicycle enhances the speed of the bicycle, and to increase the speed the driving sprocket 5 is accordingly increased in size and an unusually high geared bicycle results.

Shields 24' are provided on the sides of the saddle for the thighs to bear up against from under and these shields form a fulcrum or "purchase" for the rider when he is pulling on the handle bars in order to hold him to his seat.

The universal joint 21 is provided between the steering post 11, and the single bar 20, so that the bicycle may at all times be steered by the rider, during the manual propulsion of the bicycle. Other means however may be devised for steering the bicycle if desired, but inasmuch as these means do not materially concern the present invention, I have not herein illustrated such means.

Having thus fully described my invention, what I claim as new and desire to secure by Letters Patent, is:

1. In a bicycle propelling device, in combination with the frame and steering post, a crank shaft and crank arms, pedals on said arms, side arms pivoted to the crank arms, links pivoted to the side arms, a handle bar pivoted to said links, and a single link pivoted to the steering post having pivotal connection to said handle bar.

2. In a bicycle propelling mechanism in combination with the frame and steering post, a pair of oscillatable crank arms, and a pedal on each arm, of a side arm connected to each crank arm, a saddle resiliently supported in the frame and pivotally connected to said side arms, upwardly extending side links connected to the side arms, a handle bar connected to the links, and a link pivoted on the steering post for pivotally supporting said side links and handle bar.

3. In a bicycle propelling mechanism in combination with the frame and steering post, a pair of oscillatable crank arms, and a side arm connected to each crank arm, a resiliently supported bifurcated saddle straddling the frame and pivotally connected to said side arms, a handle bar and side links supported therefrom and connected to said side arms, and a link pivoted on the steering post for pivotally supporting said side links and handle bar.

4. The combination in a bicycle propelling device with the crank, crank arms, frame, and steering post, of a pair of side arms pivoted to said crank arms each having a knee plate, and a saddle resiliently supported in the frame pivotally connected to said side arms, a pair of side links pivoted to said side arms, and a supporting link pivoted to the steering post and pivotally connected to said side links.

In testimony whereof I affix my signature in presence of two witnesses.

NINKO SPANOVIC.

Witnesses:
ARNO J. VOIGT,
ROBERT E. DETTE.

Copies of this patent may be obtained for five cents each, by addressing the "Commissioner of Patents. Washington, D. C."